United States Patent [19]

Roos et al.

[11] Patent Number: 5,064,094
[45] Date of Patent: Nov. 12, 1991

[54] PELLET DISPENSING UNIT

[75] Inventors: William N. Roos, Colgate; Frank A. Blatnik, Butler, both of Wis.

[73] Assignee: Autotrol Corporation, Milwaukee, Wis.

[21] Appl. No.: 428,562

[22] Filed: Oct. 30, 1989

[51] Int. Cl.⁵ .............................................. B65G 59/00
[52] U.S. Cl. ................................... 221/265; 264/272.2
[58] Field of Search ............... 221/265, 277, 263, 197, 221/258; 222/370, 333, 367; 361/536, 539; 310/43; 264/272.2, 272.19

[56] References Cited

U.S. PATENT DOCUMENTS

| | | | |
|---|---|---|---|
| 2,330,256 | 9/1943 | Ashton | 221/265 |
| 3,210,577 | 10/1965 | Hogue | 264/272.2 |
| 3,344,513 | 10/1967 | Bemmann et al. | 264/272.2 |
| 3,785,525 | 1/1974 | Handeland | 221/265 |
| 4,235,849 | 11/1980 | Handeland | 422/263 |
| 4,662,538 | 5/1987 | Goudy | 221/165 |
| 4,721,228 | 1/1988 | Bejerano | 221/265 |
| 4,806,083 | 2/1989 | LaGrange et al. | 264/272.2 |

Primary Examiner—D. Glenn Dayoan
Assistant Examiner—Kenneth Noland
Attorney, Agent, or Firm—Quarles & Brady

[57] ABSTRACT

A pellet dispenser unit in which a container of pellets can be attached to a motor and rotor assembly while the container is in an upright position. After attachment with the container, the container is inverted and the motor and rotor with the container are placed in a housing member from which the pellets are dispensed. The motor is electrically connected automatically when the motor and rotor assembly is placed in the housing member. In a preferred manner, plastic foam is placed in a housing for the motor and rotor to protect the motor as well as a circuit board from any corrosive fumes. The motor and rotor assembly are placed in a housing which is constructed so as to be easily handled by one hand for ease of attachment to the container when the container is in an upright position and the motor and rotor assembly inverted.

13 Claims, 3 Drawing Sheets

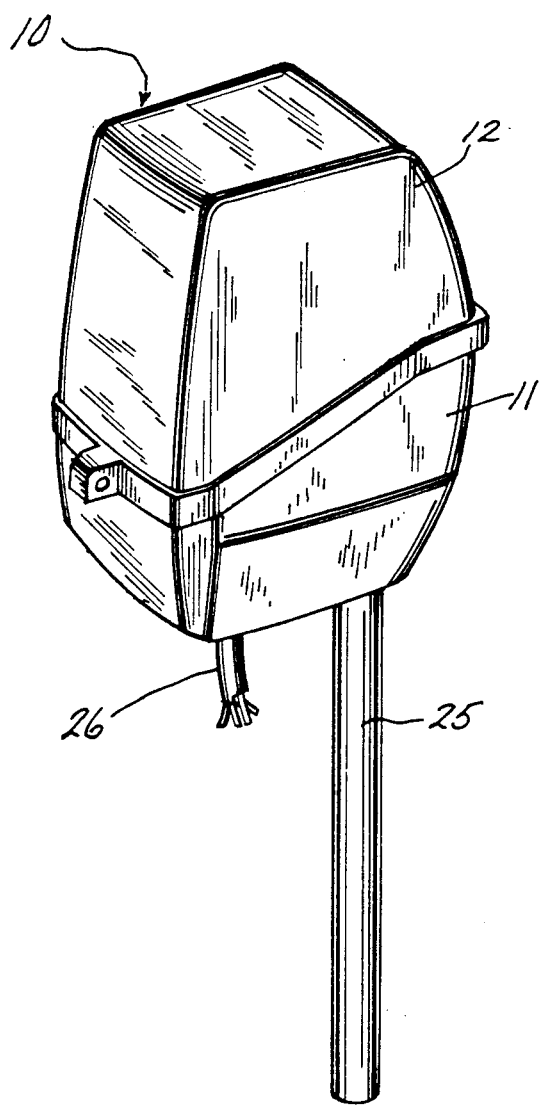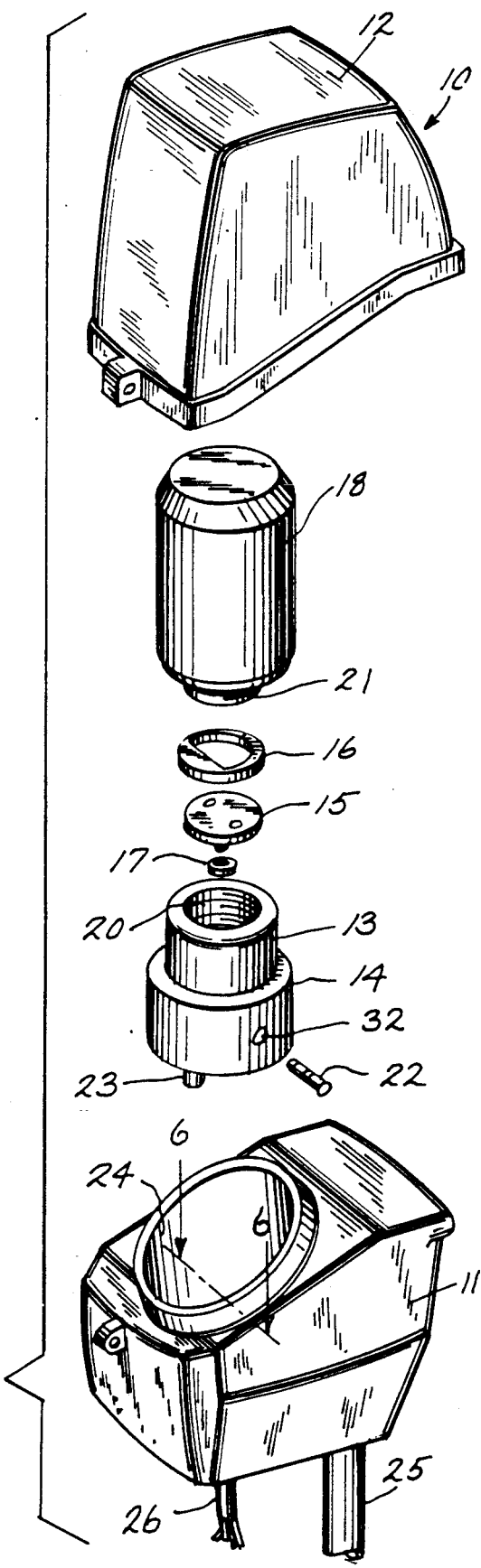

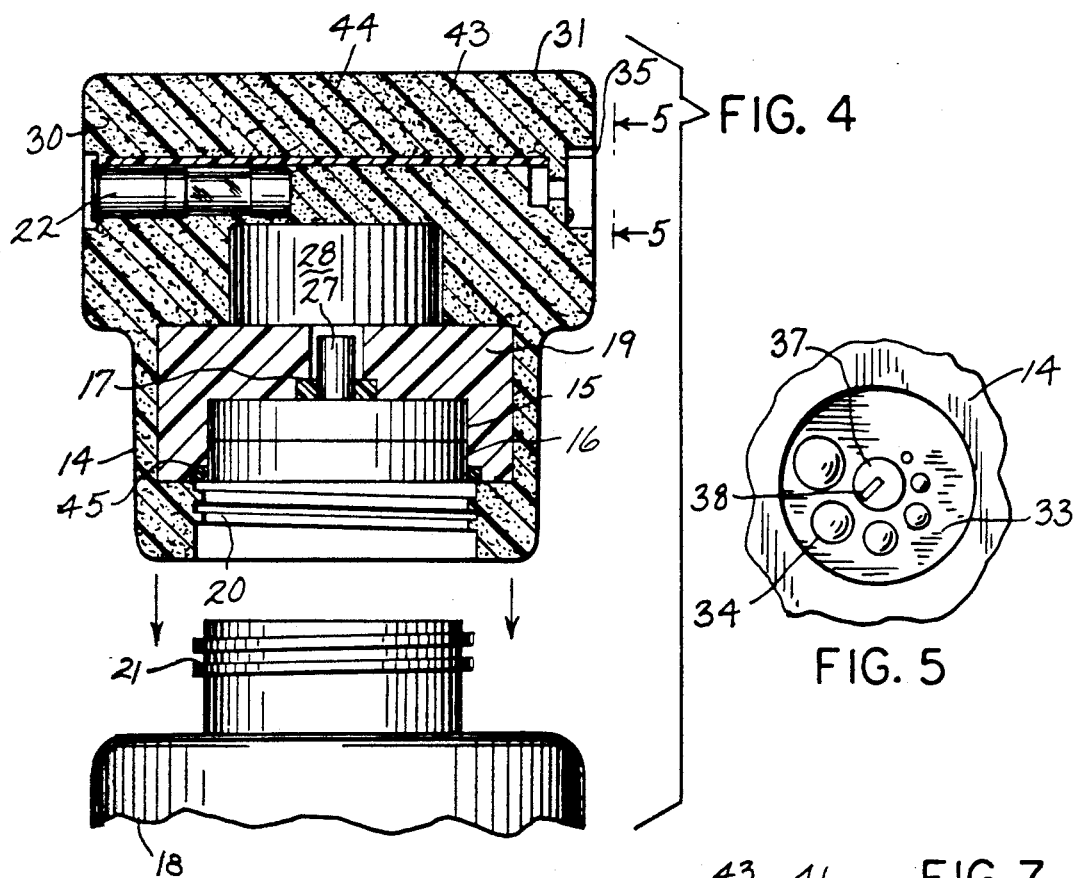
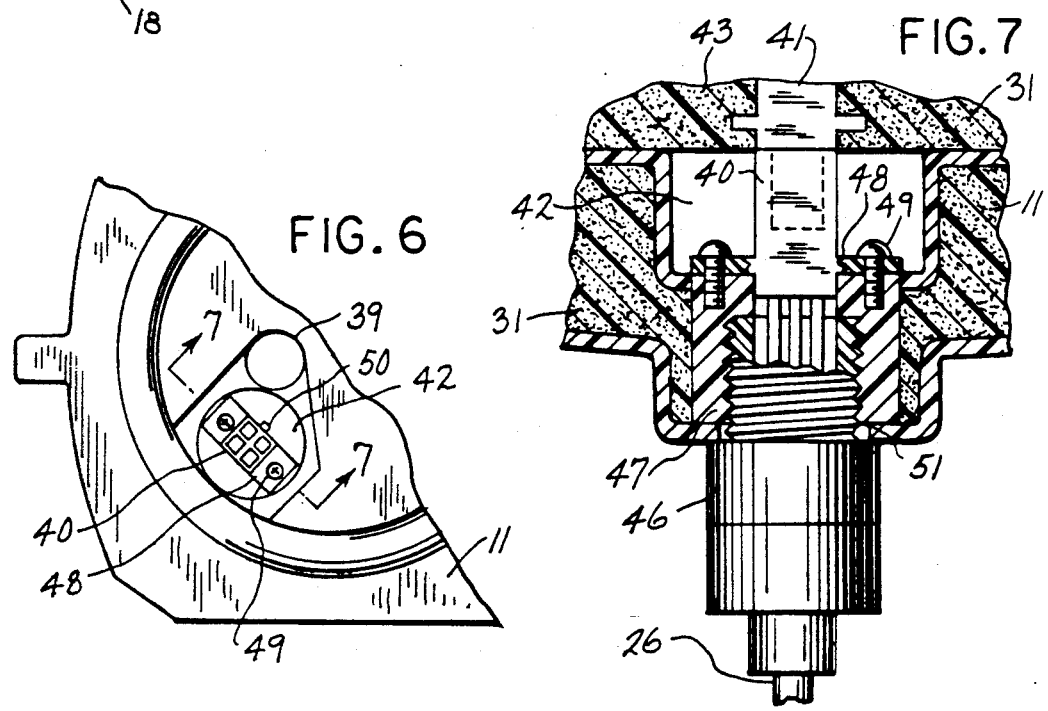

PELLET DISPENSING UNIT

BACKGROUND OF THE INVENTION

This invention relates to a pellet dispensing device which can be easily loaded with a supply of pellets from a bulk supply source. More particularly, it relates to a pellet dispensing apparatus which affords connection between a container of pellets and a motor and rotor assembly which is subsequently placed inside a protective housing with the container in an inverted position.

Chemical pellet dispensing devices of the type concerned with this invention are disclosed in U.S. Pat. Nos. 3,785,525; 4,235,849; and 4,662,538, the latter patent being commonly assigned. All of these patents use a metering or pellet plate for presenting pellets through an aperture in a base plate. A pellet dispenser of this general type is also described in the Application entitled "Pellet Dispenser" which is being filed simultaneously herewith as Ser. No. 07/429,263 filed Oct. 30, 1989, now U.S. Pat. No. 5,014,877 and is also commonly assigned. In the foregoing apparatus, it is necessary at times to replenish the supply of pellets. This is commonly done by opening a container and dumping the pellets from the container into a hopper. This can be a problem, not only from the standpoint of spillage, but also in the instance where the pellets are corrosive. The pellets and the emitted fumes can come in contact with the operator.

It would be desirable if there were available a pellet dispensing device wherein the supply container can remain in an upright position when it is connected to the pellet dispenser and thus obviate the previously mentioned problems of spillage and/or exposure to corrosive fumes.

It is an advantage of the present invention to provide a pellet dispensing unit which affords efficient loading of the pellets into the pellet dispenser.

It is another advantage of this invention to provide a pellet dispensing unit wherein a container for the pellets can be connected to the pellet dispenser with minimum exposure of the operator to the pellet fumes.

It is still another advantage of this invention to provide a pellet dispensing unit wherein a combined motor and rotor assembly can be easily handled by a one handed operation and connected to a pellet container.

It is yet another advantage of this invention to provide a pellet dispensing unit wherein the preassembled container with the motor and rotor assembly is easily inserted into a protective housing member from which the pellets are dispensed.

It is yet another advantage of this invention to provide a pellet dispensing unit in which the motor and the circuitry therefore are encased in a protective plastic material.

Other advantages of this invention are a pellet dispensing unit wherein electrical connection is made with the motor when it is inserted into a protective housing member as well as a protective housing member which is aesthetically pleasing in appearance.

SUMMARY OF THE INVENTION

The foregoing advantages are accomplished and the shortcomings of the prior art are overcome by the present pellet dispenser unit which includes a motor and a rotor assembly disposed in a combined housing. The combined housing includes attachment means for a pellet container and is constructed and arranged to be inverted so as to be easily attached to the container when the container is in an upright position. A pellet discharge tube extends from the assembly housing as well as an electrical connection means. A protective housing member receives the motor and rotor assembly with the protective housing including a pellet discharge tube and an electrical connection means for connection with the respective pellet discharge tube, and the electrical connection means extending from the rotor and motor assembly housing.

In a preferred embodiment, the attachment means is defined by threaded engagement means in the motor and rotor assembly housing, and the pellet container includes complementary threaded engagement means.

In one aspect of the invention, there are circuit means disposed in the assembly housing, and the motor and the circuit means are encased in a foamed plastic material.

In another aspect of the invention, the housing for the motor and rotor assembly is constructed and arranged to be handled in a one hand operation.

BRIEF DESCRIPTION OF THE DRAWINGS

A better understanding of the present pellet dispensing device will be accomplished by reference to the drawings wherein:

FIG. 1 is a perspective view illustrating the pellet dispensing unit of this invention.

FIG. 2 is an assembly view thereof.

FIG. 4 is a view in vertical section showing the motor and rotor assembly before being attached to a container.

FIG. 5 is a partial end view taken along line 5—5 of FIG. 4.

FIG. 6 is a partial view in horizontal section taken along line 6—6 of FIG. 2.

FIG. 7 is a partial view in vertical section illustrating the electrical connection between the motor and rotor assembly and the protective housing.

DESCRIPTION OF THE EMBODIMENTS OF THE INVENTION

Figure 3:
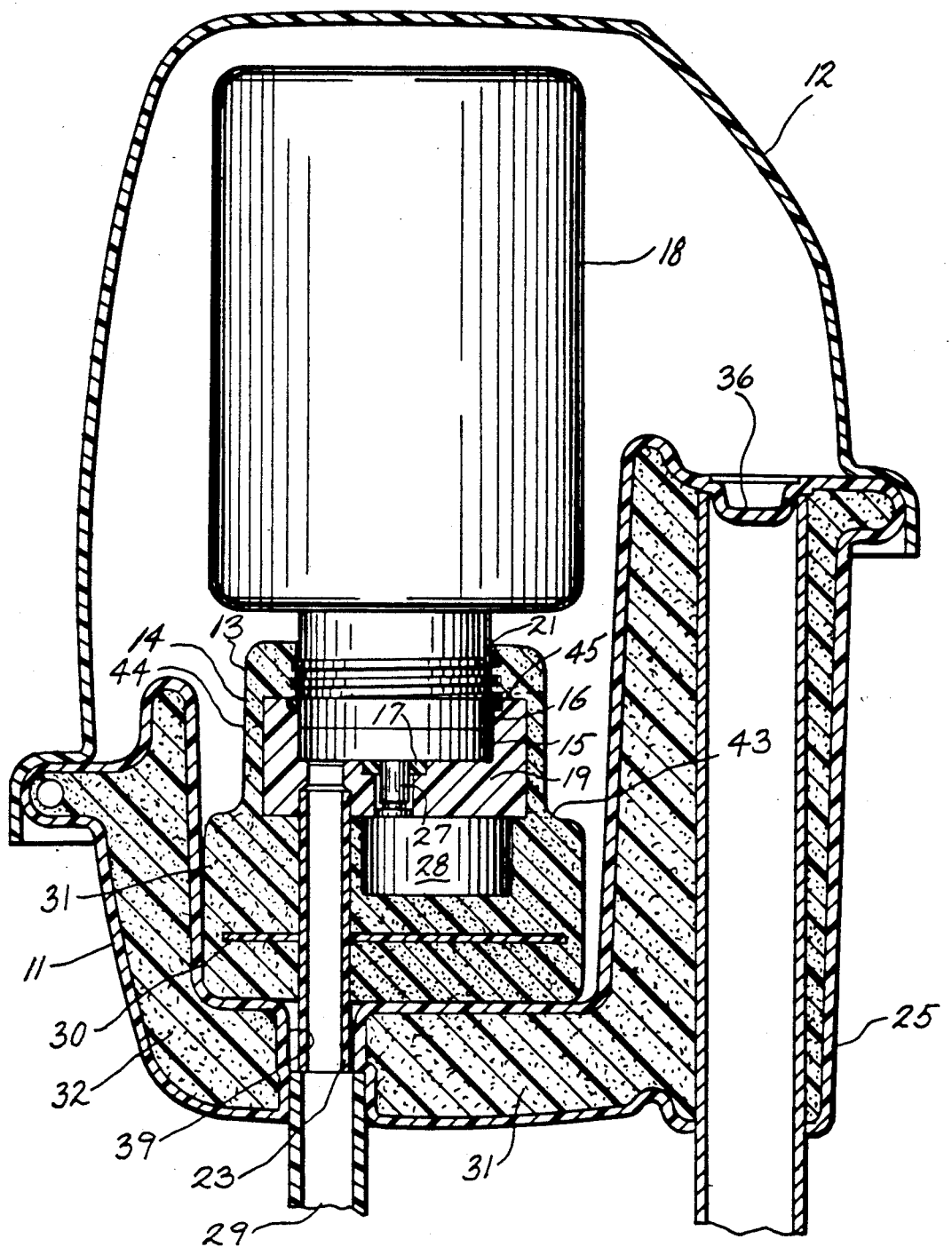
FIG. 3 is a view in vertical section with the components in an assembled condition and inside the unit shown in FIG. 1.

Proceeding to a detailed description of the embodiments of the present invention and particularly to FIGS. 1 and 2, the pellet dispensing unit generally 10 includes a protective housing as represented by a base member 11 which is closed by a cover 12. A support post 25 extends from the base member 11, and an electrical cord 26 is also connected thereto for purposes as will be later explained. As indicated in FIG. 2, there is placed inside the base member 11 and the cover 12, a combined motor and rotor assembly 14 which has assembled therein a rotor member 15 and a bearing washer 17 as well as a dam member 16. The rotor member 15 and the dam member 16 are the subject matter of a co-pending application as previously referred to above entitled "Pellet Dispenser" which teachings are hereby incorporated by reference. The motor and rotor assembly 14 has a pellet discharge tube 23 extending therefrom, as well as an aperture 32 for receiving a fuse 22. The motor and rotor assembly 14 also includes a collar portion 13 with internal threads 20 for receiving the external threads 21 of the pellet container 18.

As best seen in FIG. 3, the container 18 is threaded to the collar 13 and the rotor member 15 as well as the dam member 16 and the bearing washer 17 are positioned in the rotor housing 19. A frictional fit retainer 45 is seated in the housing 19 and adjacent the dam member 16 for holding the dam member 16 in place when the motor and rotor assembly 14 is inverted as shown in FIG. 4. The rotor member 15 is driven by means of the drive shaft 27 connected to the motor 28. The motor and rotor assembly 14 includes a circuit board 30 which serves to control the motor 28. Plastic foam 31 encapsulates the circuit board 30 as well as the motor 28 to provide a body 43 for the assembly 14 having a skin 44 thereover. As the container 18 can contain pellets of a corrosive material such as chlorine, it is desirable to protect the circuit board 30 as well as the motor 28 from these corrosive materials and the fumes emitted therefrom. This is accomplished by using the encapsulating foam material 31. It will be also noted that the same plastic foam material 31 is placed inside the base member 11. This serves to stabilize and secure the mounting post 25. In addition, the post is partially stabilized and located in the base member 11 by means of the extension portion 36. While not shown in the drawings, this post member is conveniently attached to the top of a well casing when it is employed to chlorinate a well. Extending from the bottom of the base member 11 is a pellet discharge tube 29 which is axially aligned with the pellet discharge tube 23 extending from the motor and rotor assembly 14.

Referring specifically to FIG. 5, there is shown a timer device 33 which would be interconnected with the circuit board 30 and the motor 28. It has dimples 34 of a progressively increasing nature recessed in a compartment 35 of the body 34. A turnable shaft 37 is centrally positioned with an indicator 38 to indicate the rate of pellet discharge. The rate will be indicated by pointing the indicator to a dimple 34 with the largest dimple indicating the fastest rate and the smallest one the lowest rate.

FIGS. 6 and 7 show the electrical connection between the base housing member 11 and the motor 28. The electrical cord 26 brings electrical current from an external source such as a water pump. This cord 26 is electrically connected to a female plug 40 positioned in a compartment 42 in the housing member 11. A male plug 41 extends from the body 43 of the motor and rotor assembly 14 and is received in the female plug 40 when the motor and rotor assembly 14 is positioned in the base housing member 11 as shown in FIG. 3. As best seen in FIG. 6, positioned adjacent the female plug 40 and its compartment 42 is an alignment opening 39 for the discharge tube 23. The male plug 41 and the discharge tube 23 extend from the motor and rotor assembly 14 in a manner so that when the discharge tube 23 is placed in the alignment opening 39 of the base housing member 11, the male plug 41 is orientated and connected to the female plug 40. Referring specifically to FIG. 7, the female plug 40 is connected to an insert 47 by the flanges 48 and the screws 49 and is located by the keyway 50. The insert 47 is fastened to the base member 11 by the foam 31 and provides connection for a liquid tight conduit connector 46 by the threads 51. The liquid tight conduit is not shown but would surround the electrical cord 26.

The ease of handling the pellet dispenser unit 10 of this invention is best illustrated in conjunction with FIG. 4. There it is seen that the container 18 is in an upright position whereas the motor and rotor assembly 14 is inverted from its position as seen in FIGS. 2 and 3. The housing 14 is constructed and arranged so that it can easily fit into and be handled in one hand of a person. The threads 20 and 21 are engaged, and the assembly 14 turned until these threads are fully engaged. After this assembly, the container 18 and the assembly 14 are then in a condition so as to be placed inside the cavity portion 24 of the base housing member 11. This is done in a manner so that the discharge tube 23 is orientated into the alignment opening 39 which will simultaneously orientate male plug 41 for insertion into the female plug 40. The cover 12 is placed over base housing member 11, and the unit 10 is then ready for operation. As mentioned earlier, the electrical cord 26 is connected to a well pump motor which, when it is operating, will send current to the circuit board 30 and ultimately to the motor 28. Control of the rate of operation of the motor 28 is done by the timer and regulator 33. As the motor 28 turns the shaft 27, this in turn rotates the rotor member 15 to discharge pellets through the discharge tubes 23 and 29 and ultimately down into the well by way of a well casing. When the supply of pellets in container 18 is diminished, the above indicated procedure is reversed, and a new container with pellets is utilized. It will be seen that from the foregoing procedure there are no pellets to be dumped into a hopper as the container 18 is the hopper itself and is connected in a unitary manner with the motor and rotor assembly 14 without having to invert the container 18 until it is connected to it.

While not shown in the drawings, it is obvious that the circuit board 30 is innerconnected to the electrical cord 26 and ultimately to the motor by normal electrical wiring. Such electrical connection includes the fuse 22 and the timer and regulator 33 in an electrical circuit. As mentioned earlier, foam material 31 has been utilized to encapsulate the motor 28 and the circuit board 30 in the body 43 of the assembly 14. While this is an advantageous procedure for protecting the motor and the circuit board, it could be eliminated. The same is true concerning the use of foam material to stabilize the support post 25 in the base housing member 11. Any alternative means for anchoring the post could be employed such as a mechanical fastening. The container 18 is shown preferably to engage the motor and rotor assembly 14 by means of the screw threads 20 and 21. Obviously any type of relatively quick engagement means between these members could be utilized such as projecting lugs and groove tracks.

The various component parts of the pellet dispenser unit except for the motor 28 and the circuit board 30 are composed of a polyurethane plastic material. For example, in the instance of the base housing member 11, the cover 12 and the body 43 for the assembly 14, these are all composed of semi-rigid polyurethane. Utilizing an inert plastic material of this type is highly advantageous where the pellets to be dispensed are composed of chlorine, and the fumes are highly corrosive to metal. This also is advantageous in connecting the assembly 14 in an inverted manner to the container 18 as the assembly body 43 will be of a relatively light weight due to its fabrication from the plastic material.

The pellet dispenser unit of this invention has been described preferably in conjunction with dispensing chlorine pellets into a well casing for water treatment. The pellet dispenser unit is just as easily operable in conjunction with other water treatment systems such as a large or small scale water cooling tower or an air conditioning system. It could also be used in conjunction with other facilities which would require the sequential placement of a pellet or tablet in the system such as in waste water treatment or food processing.

The foregoing invention can now be practiced by those skilled in the art. Such skilled persons will know that the invention is not necessarily restricted to the particular embodiments presented herein, but the scope of the invention is to be defined by the terms of the following claims as given meaning by the preceding description.

We claim:

1. A pellet dispenser unit comprising:
    a motor and a rotor assembly, said assembly including attachment means for a pellet container and being constructed and arranged to be inverted so as to be easily attached to said container when said container is in an upright position;
    a pellet discharge tube extending from said motor and rotor assembly;
    electrical connection means disposed on said motor and rotor assembly; and
    a housing member for detachably receiving said combined motor and rotor assembly, said housing member including a pellet discharge tube and electrical connection means, said electrical connection means of said housing member and said motor and rotor assembly constructed and arranged for alignment when said pellet discharge tube of said housing member is aligned with said pellet discharge tube of said motor and rotor assembly.

2. The pellet dispenser unit of claim 1 wherein said attachment means is defined by threaded engagement means and said pellet container includes complementary threaded engagement means.

3. The pellet dispenser unit of claim 2 wherein said threaded engagement means is defined by internal screw threads in said motor and rotor assembly and external screw threads on said pellet container.

4. The pellet dispenser unit of claim 1 wherein said housing member for receiving said combined motor and rotor assembly includes a cavity portion for placement of said combined motor and rotor housing therein with said pellet container in an inverted position.

5. The pellet dispenser unit of claim 4 wherein said electrical connection means of said housing member for receiving said combined motor and rotor assembly is placed at a bottom of said cavity portion.

6. The pellet dispenser unit as defined in claim 1 further including circuit means disposed in said combined housing, said motor and said circuit means being encased in a solid plastic material.

7. The pellet dispenser unit as defined in claim 6 wherein said plastic material is a foam material.

8. The pellet dispenser unit as defined in claim 1 further including a cover member for said housing member.

9. The pellet dispenser unit as defined in claim 1 further including a post member extending from housing member, said post member being secured in said housing member by encasement in a solid plastic material.

10. The pellet dispenser unit as defined in claim 1 wherein said pellet container contains chlorine pellets.

11. In a pellet dispensing unit wherein pellets are dispensed by a rotor driven by a motor with said motor and said rotor located in a housing from which extends a pellet discharge tube, the improvement comprising:
    said motor and said rotor constructed in a one piece body member, with said body member including attachment means for a pellet container in which said pellets are originally supplied, said one piece body member being constructed and arranged to be inverted so as to be easily attached to said container when said container is in an upright position and subsequently connected to a housing having a pellet discharge tube and electrical connection means; and
    wherein a pellet discharge tube and electrical connection means are open externally from said one piece body member for respective connection to said pellet discharge tube and to said electrical connection means of said housing.

12. The combined motor and rotor assembly as defined in claim 11 wherein said combined body member for said motor and rotor is constructed and arranged for a single handed operation.

13. A pellet dispenser unit comprising:
    a motor and a rotor assembly including circuit means and foam plastic encapsulating a motor and rotor and said circuit means in said assembly, said assembly further including threaded engagement means for a pellet container and being constructed and arranged to be inverted so as to be easily attached to said container when said container is in an upright position;
    a pellet discharge tube extending from said motor and rotor assembly;
    electrical connection means disposed on said motor and rotor assembly; and
    a housing member for detachably receiving said combined motor and rotor assembly, said housing member including a pellet discharge tube and electrical connection means encapsulated in foam plastic, said electrical connection means of said housing member and said motor and rotor assembly constructed and arranged for alignment when said pellet discharge tube of said housing member is aligned with said pellet discharge tube of said motor and rotor assembly.

* * * * *